United States Patent
Feng

(10) Patent No.: US 7,149,420 B1
(45) Date of Patent: Dec. 12, 2006

(54) AUTO-FOCUSING LENS WITH PROGRESSIVE VARIABLE FOCAL ELEMENT

(75) Inventor: Chen Feng, Bothell, WA (US)

(73) Assignee: MagnaChip Semiconductor, Inc., Santa Clara, CA (US)

( * ) Notice: Subject to any disclaimer, the term of this patent is extended or adjusted under 35 U.S.C. 154(b) by 102 days.

(21) Appl. No.: 10/973,540

(22) Filed: Oct. 25, 2004

(51) Int. Cl.
*G03B 17/00* (2006.01)
*G03B 7/099* (2006.01)
*G03B 9/10* (2006.01)
*G03B 13/00* (2006.01)
*H04N 5/238* (2006.01)

(52) U.S. Cl. .................. 396/72; 396/111; 396/452; 396/495; 348/345; 348/368

(58) Field of Classification Search ............... 396/89, 396/111, 112, 116, 493, 495, 72, 452; 348/335, 348/345, 367, 368
See application file for complete search history.

(56) References Cited

U.S. PATENT DOCUMENTS

| | | | |
|---|---|---|---|
| 4,338,011 A | * | 7/1982 | Pizzuti ................. 396/132 |
| 4,459,004 A | * | 7/1984 | Morizumi ............... 396/106 |
| 5,117,247 A | * | 5/1992 | Nakai et al. ............ 396/377 |
| 2003/0002867 A1 | * | 1/2003 | Ojala ..................... 396/73 |

FOREIGN PATENT DOCUMENTS

JP  03-078723  * 3/1991

* cited by examiner

*Primary Examiner*—W. B. Perkey
*Assistant Examiner*—Chia-how Michael Liu
(74) *Attorney, Agent, or Firm*—Greenberg Traurig, LLP

(57) ABSTRACT

An improved method and module for auto focusing utilizes a variable thickness focus element. A different thickness, and thus a different focus, is optically coupled to an image sensor by rotating the focus element. Movement along the optic axis is not required. This minimizes the amount of space required to provide the auto focusing function, allowing a mobile device utilizing the module to be smaller while still providing the auto focusing feature. In addition, the mechanism for rotating the focus element is smaller and/or less complex than a mechanism for moving a lens assembly along the optic axis, further allowing the device to be smaller. The focus element has less inertia than conventional lens assemblies and so required less power to move and allows for fast focusing.

10 Claims, 3 Drawing Sheets

AUTO-FOCUSING LENS WITH PROGRESSIVE VARIABLE FOCAL ELEMENT

FIELD OF THE INVENTION

The present invention relates to auto focusing lenses, and more particularly to auto focusing lenses in mobile devices.

BACKGROUND OF THE INVENTION

FIG. 1 illustrates a conventional auto focusing system. The system includes a lens assembly 101 for focusing an image onto an image sensor 102. To facilitate the focusing of the image, the lens assembly 101 moves along the optic axis, i.e., along the focus arrow illustrated in FIG. 1. Thus, a certain amount of space is required to allow the required range of movement by the lens assembly 101. When used in a mobile device, such as a mobile phone camera, this required space limits how small the device can be. The mechanical mechanism required to move the lens assembly 101 also requires space and power.

Accordingly, there exists a need for an improved method and module for auto focusing. The improved method and module should minimize the amount of space required to facilitate the auto focusing function. The present invention addresses such a need.

SUMMARY OF THE INVENTION

An improved method and module for auto focusing utilizes a variable thickness focus element. A different thickness, and thus a different focus, is optically coupled to an image sensor by rotating the focus element. Movement along the optic axis is not required. This minimizes the amount of space required to provide the auto focusing function, allowing a mobile device utilizing the module to be smaller while still providing the auto focusing feature. In addition, the mechanism for rotating the focus element is smaller and/or less complex than a mechanism for moving a lens assembly along the optic axis, further allowing the device to be smaller. The focus element has less inertia than conventional lens assemblies and so required less power to move. When the mobile camera reach multi-million pixels resolutions, the lens assembly becomes more complicated with more elements in the assembly. It becomes difficult to move the lens assembly fast enough. The focusing element in accordance with the present invention addresses this by allowing no limit rotation for a fast focusing motion.

DETAILED DESCRIPTION

The present invention provides an improved method and module for auto focusing. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
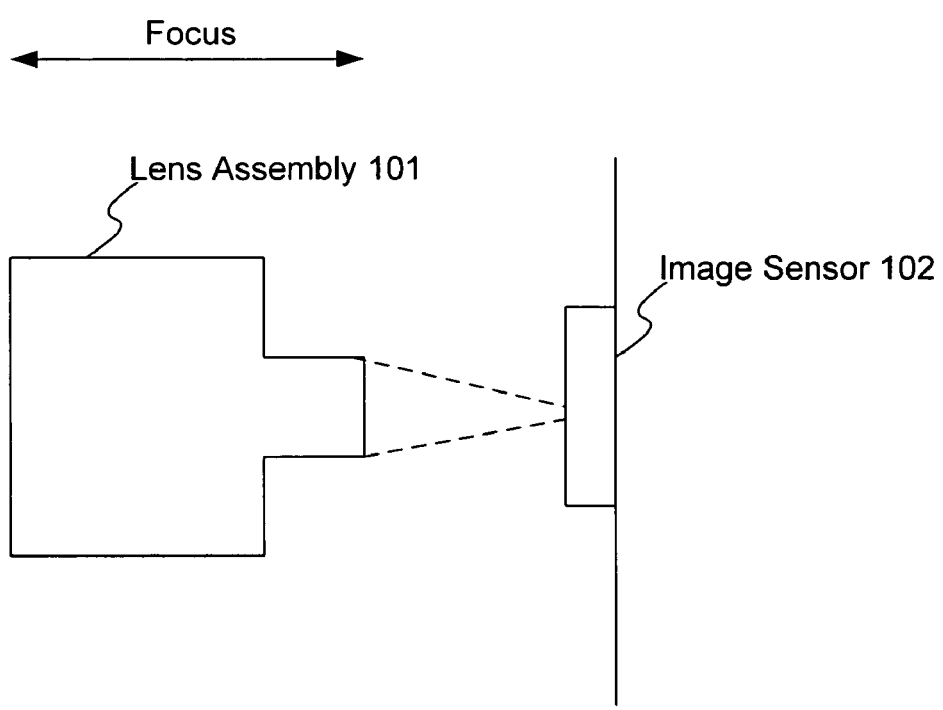
FIG. 1 illustrates a conventional auto focusing system.
Figure 2:
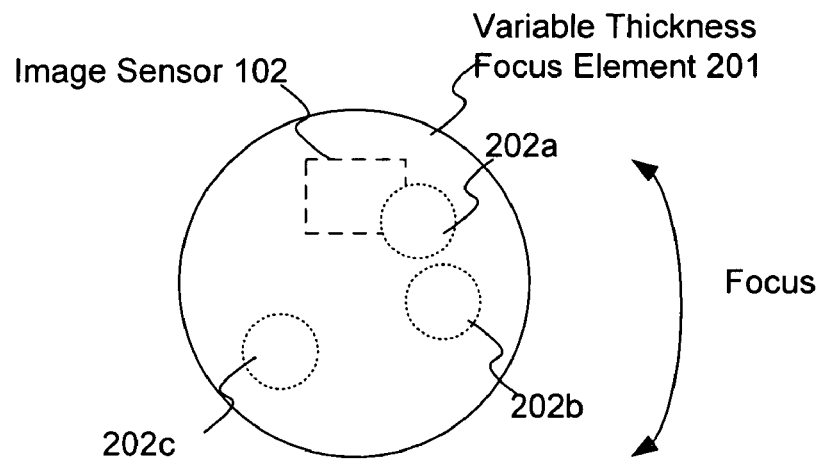
FIGS. 2 and 3 illustrate a first embodiment of an image module for auto focusing in accordance with the present invention.
Figure 3:
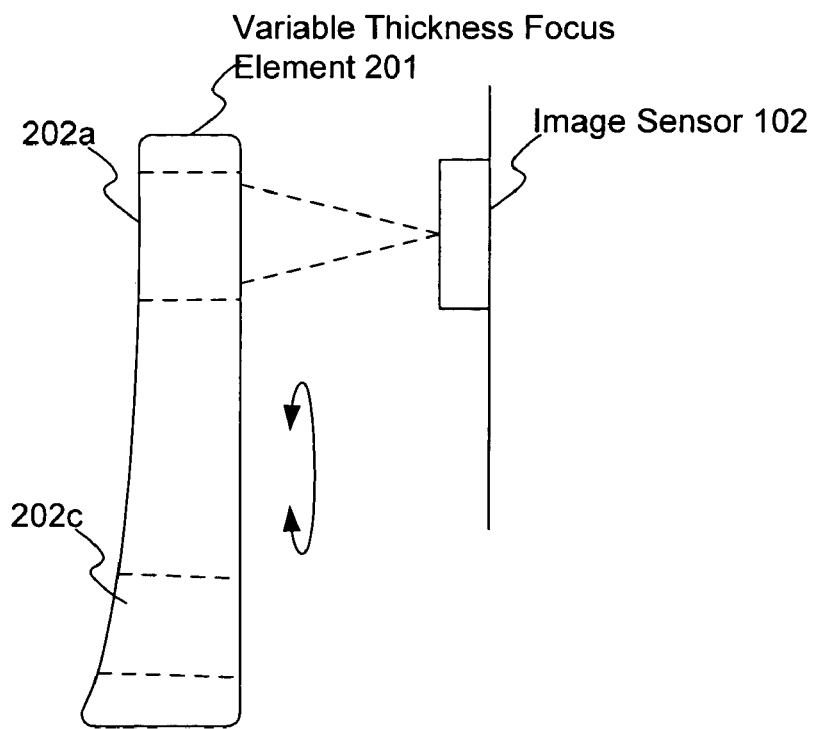

FIGS. 2 and 3 illustrate a first embodiment of an image module for auto focusing in accordance with the present invention. FIG. 2 illustrates a front view, while FIG. 3 illustrates a side view. The image module includes a variable thickness focus element 201 for focusing an image onto the image sensor 102, such as portion 202a as illustrated in FIG. 3. The focus element 201 can be moved to optically couple different portions 202a–202c with the image sensor 102. Each portion 202a–202c has a different thickness, providing a different focus onto the image sensor 102. In this embodiment, the focus element 201 is rotated, such as on a spindle (not shown). Other manners of moving the focus element 201 are possible.

Unlike conventional focusing systems, the focus element 201 need not move along the optic axis in order to focus an image onto the image sensor 102. The amount of space required for the movement of the focus element 201 is significantly less. When used in a mobile device, such as a mobile phone camera, the device can be smaller while still providing the auto focusing feature. In addition, the mechanism for rotating the focus element 201 is smaller and/or less complex than a mechanism for moving a lens assembly along the optic axis, further allowing the device to be smaller. The focus element 201 has less inertia than conventional lens assemblies and so required less power to move.

Figure 4:
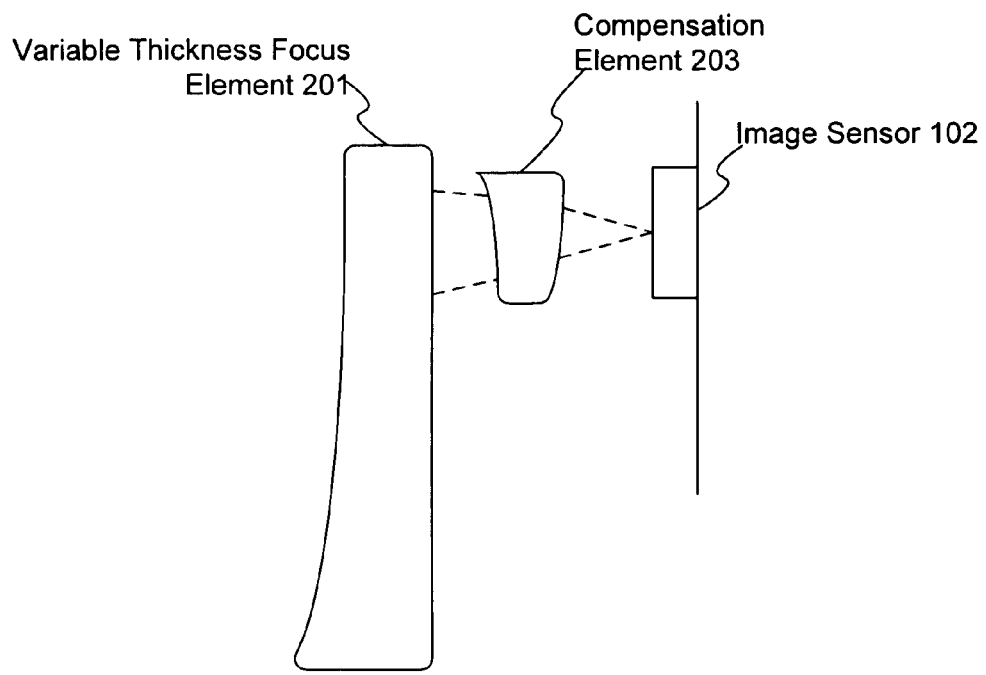
FIG. 4 illustrates a second embodiment of the image module for auto focusing in accordance with the present invention.

FIG. 4 illustrates a second embodiment of the image module for auto focusing in accordance with the present invention. In this embodiment, a compensation element 203 is added along the optic path between the focus element 201 and the image sensor 102. The compensation element 203 corrects for any imperfections in the focus onto the image sensor 102. For example, if the focus element 201 has a progressively variable thickness, the compensation element 203 can correct for gradients that occur between the target lengths. It can also serve as a protective window for the image sensor 102. In this embodiment, the compensation element 203 is fixed, but it can be moveable as well. It is also easier to produce than conventional lens assemblies.

Figure 5:
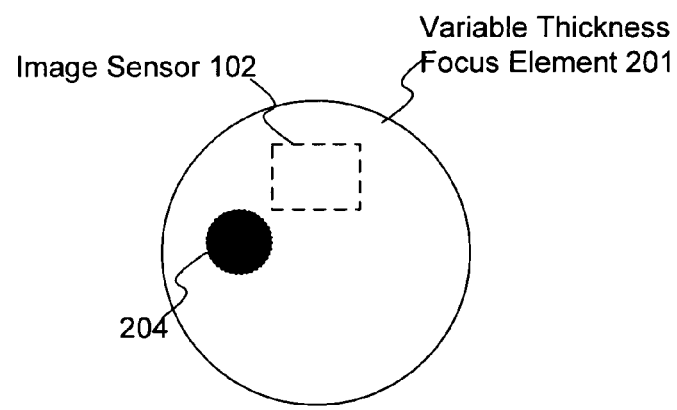
FIG. 5 illustrates a third embodiment of the image module for auto focusing in accordance with the present invention.

FIG. 5 illustrates a third embodiment of the image module for auto focusing in accordance with the present invention. In this embodiment, the focus element 201 includes a dark portion 204. When the focus element 201 is moved so that the dark portion 204 is in front of the image sensor 102, the dark portion 204 functions as a closed shutter, where no light reaches the image sensor 102. This eliminates the need for a separate shutter mechanism, further allowing the mobile device to be smaller.

An improved method and module for auto focusing has been disclosed. The method and module utilizes a variable thickness focus element. A different thickness, and thus a different focus, is optically coupled to an image sensor by rotating the focus element. Movement along the optic axis is not required. This minimizes the amount of space require to provide the auto focusing function, allowing a mobile device utilizing the module to be smaller. The dark portion of the focusing element also can provide a zero position indicator for the image sensor to detect the home position of the focusing movement. This eliminates the need for a positioning sensor, as is required in the conventional auto-focusing lens.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An image module, comprising:
   an image sensor;
   a focus element comprising variable thicknesses for providing a variable focus into the image sensor; and
   a compensation element optically coupled to the image sensor for compensating for gradients from the focus element.

2. The image module of claim 1 wherein the compensation element is stationary.

3. The image module of claim 1 wherein the compensation element is adjustable.

4. An image module, comprising:
   an image sensor; and
   a focus element comprising: variable thicknesses for providing a variable focus onto the image sensor, and a dark portion, which functions as a shutter.

5. The image module of claim 4 wherein the dark portion is a zero position indicator for the image sensor to detect a home position of focusing movement.

6. A method for focusing, comprising:
   placing a focus element at a first orientation with a first thickness to provide a focus to an image sensor;
   changing the focus by placing the focus element at a second orientation with a second thickness; and
   optically coupling a compensation element to the image sensor for compensating for gradients from the focus element.

7. The method of claim 6 wherein the compensation element is stationary.

8. The method of claim 6 wherein the compensation element is adjustable.

9. A method for focusing, comprising:
   placing a focus element at a first orientation with a first thickness to provide a focus to an image sensor; and
   changing the focus by placing the focus element at a second orientation with a second thickness, wherein the focus element comprises a dark portion, which functions as a shutter.

10. The method of claim 9 wherein the dark portion is a zero position indicator for the image sensor to detect a home position of focusing movement.

* * * * *

UNITED STATES PATENT AND TRADEMARK OFFICE
CERTIFICATE OF CORRECTION

| | | |
|---|---|---|
| PATENT NO. | : 7,149,420 B1 | Page 1 of 1 |
| APPLICATION NO. | : 10/973540 | |
| DATED | : December 12, 2006 | |
| INVENTOR(S) | : Chen Feng | |

It is certified that error appears in the above-identified patent and that said Letters Patent is hereby corrected as shown below:

Title Page, Item (57)
In the Abstract,
Line 13, remove "required" and replace with -- requires --.

Signed and Sealed this

Twenty-seventh Day of February, 2007

JON W. DUDAS
*Director of the United States Patent and Trademark Office*